(No Model.) 2 Sheets—Sheet 2.

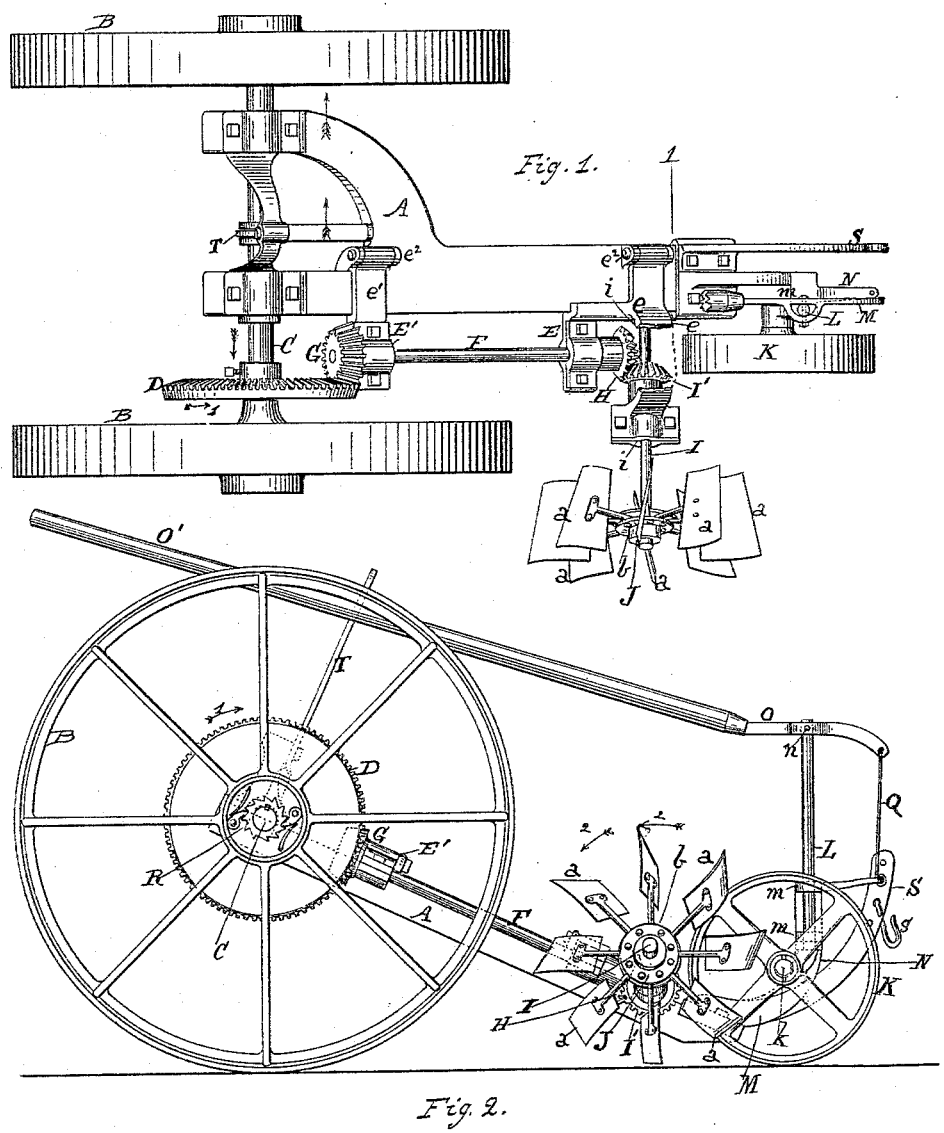

A. L. SADDLEMYRE.
WEEDING MACHINE.

No. 401,378. Patented Apr. 16, 1889.

UNITED STATES PATENT OFFICE.

AMBROSE L. SADDLEMYRE, OF KNOX, NEW YORK, ASSIGNOR OF ONE-HALF TO ALVINZA QUAY, OF SAME PLACE.

WEEDING-MACHINE.

SPECIFICATION forming part of Letters Patent No. 401,378, dated April 16, 1889.

Application filed March 29, 1888. Serial No. 268,743. (No model.)

*To all whom it may concern:*

Be it known that I, AMBROSE L. SADDLEMYRE, a citizen of the United States, residing in the town of Knox, in the county of Albany and State of New York, have invented certain new and useful Improvements in Weeding-Machines, of which the following is a specification.

My invention relates to improvements in weeding-machines to be drawn by animals or otherwise; and it consists of the combination of devices and parts hereinafter particularly described, and specifically set forth in the claims.

The object of my invention is to provide in a weeding-machine means by which a revolving weeding-hoe will be revolved in a rapid manner in contact with the soil and weeds growing therein, and cut, scrape, or otherwise carry the weeds from the soil, and also to provide means by which the machine will be under control of the driver. I attain these objects by the means illustrated in the accompanying drawings, in which—

Figure 4:
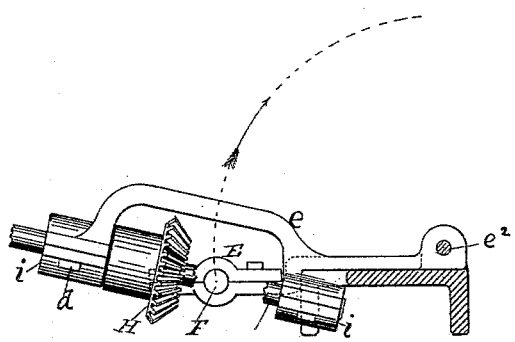
Figure 3:
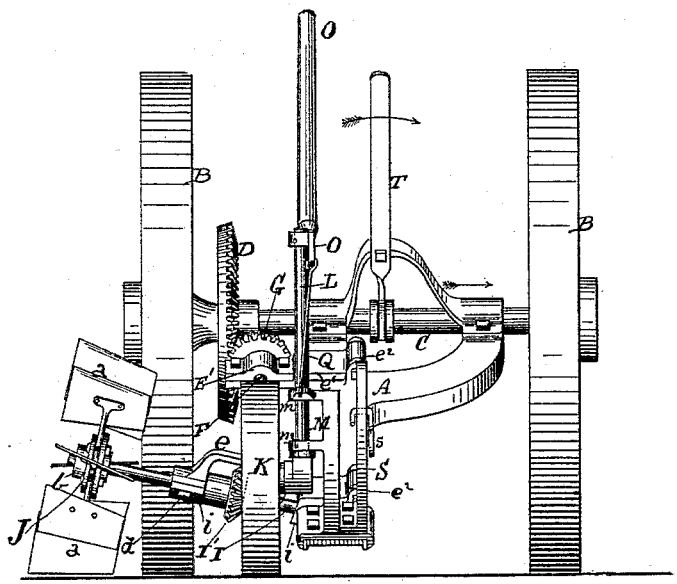
Figure 5:
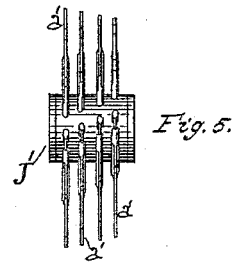
Figure 6:
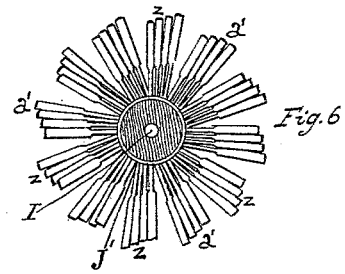

Figure 1 is a plan view of the machine containing my improvements. Fig. 2 is a side elevation of the same. Fig. 3 is a front view of the machine. Fig. 4 is a horizontal view taken at line 1 in Fig. 1, and illustrating the manner in which the gear mechanism is hinged to the frame. Fig. 5 is a side elevation of a modified form of weeding-hoe, and Fig. 6 is an end view of the same.

The same letters of reference refer to like parts throughout the several views.

In the drawings, A represents the frame of the machine, which can be of iron or wood, or both combined.

B B are the driving-wheels loosely mounted on the shaft C, which shaft is supported in suitable bearings from the frame A. By means of ratchet-wheels and pawls R P, Fig. 2, the driving wheels B are made to hold with shaft C when the said wheels are revolving forward.

D is a bevel gear-wheel secured to shaft C, so as to revolve with it.

E E' are bearings pivoted to the frame A in any suitable manner, and preferably to the upper side of the same, and at the lateral side off from the side the said bearings are situated as shown in Fig. 1.

F is a shaft mounted in bearings E E', and having secured to its upper end the bevel-pinion G and to its forward end the bevel-pinion H. Pinion G engages with the gear-wheel D when the machine is operating.

I is a revolving shaft supported in suitable bearings, $i\ i$, which are connected with the frame A. I preferably connect these bearings $i\ i$ of said shaft with the hinged bracket $e$ of bearing E. This shaft I is the shaft for revolving the series of blades or cutters $a\ a$, which, with the hub $b$, which is adjustably secured to shaft I, constitute the revolving weeding-hoe J. These blades or cutters $a\ a$ are secured to the adjustable hub $b$ in such a manner that they will, in direction of their length from one side end to the other, stand relatively oblique to the axis of said hub, as illustrated in Figs. 1 and 3. The shaft I of this revolving hoe is set at an incline, as shown in Figs. 2, 3, and 4, and the cutting-edges of the blades or cutters $a\ a$ are so beveled or inclined from one edge end to the other that they will be about horizontal when they are down at the ground, as shown in Fig. 3. This revolving weeding-hoe J can be moved on shaft I in either direction, so as to carry the cutting-blades nigher to frame A, or farther from the same, or be wholly removed from said shaft, and it is secured to said shaft I by a suitable set-screw, $j$, screwing into the hub $b$ and against the said shaft. Being thus constructed and secured, this revolving weeding-hoe can, by its hub $b$ and set-screws $j$, be set for weeding between narrow rows or wide rows, as may be required, or be set to work close up to the plants or at a greater or less distance from the same. Shaft I has on it pinion I'.

K is a guide-wheel revolving freely on the pintle $k$, connected with the vertical shaft L, and projected laterally toward the revolving hoe, as shown.

M is a bracket secured to the front end of the frame A, and projecting from a side of this bracket are the arms $m\ m$, which are pierced vertically and receive the vertical shaft L, as shown. N is an arm which is connected with the upper end of the bracket M, and is projected forwardly, as shown in Figs. 1 and 2.

The vertical shaft L of the guide-wheel K is extended above the upper end of the bracket M, and has pivoted to it by a suitable pivot, n, the lever O, which lever is provided with a suitable handle, O', for convenience of operating the said lever. The forward end of this lever is connected with the arm N by any suitable rod or connection, Q. When the handled end of this lever O is pressed down, the lever will be made, through rod Q, to lift the forward end of the bracket M, and thereby raise the forward end of the frame A and lift the revolving hoe out of or up from the soil; and when the handle P is turned as a tiller to the right the guide-wheel will be turned to the left, and when said handle is turned the reverse the wheel will be turned to the right.

S is a draft-bracket secured in any suitable manner to the forward end of the frame A, and is provided with a draw-hook, s, by means of which the animal can be made to draw the machine.

T is a shifting-lever pivoted to the frame A by any suitable piece, as t, and having its fork engaging with the shaft C between the collars c c, as shown. By means of this shifter the shaft C can be moved in direction of arrow 1, so as to throw the bevel-wheel D out of engagement with pinion G.

A seat for the driver can be mounted on the frame A by means of a suitable standard connecting said seat with said frame.

In Figs. 5 and 6 is shown a modified form of weeding-hoe in which the cutters are a series of radial narrow blades or cutters arranged in rows and at short intervals apart, as shown. These blades or cutters $a'$ $a'$ of this weeding-hoe J' are so set in line of their cross direction of series of ends as to be on conical or tapering lines, as on lines $z$ $z$, as shown in Fig. 5, so that when secured on shaft I the ends of these blades, when down to the ground, will be substantially on horizontal lines, as are the edges of the blades $a$ $a$ of the revolving hoe J in Fig. 3.

When this machine is drawn forward, the drive-wheels B will be revolved, and by means of the ratchet-wheels and pawls R P revolve the shaft C and attached bevel gear-wheel D in direction of arrow 1 in Fig. 2, when a rapid motion will be imparted to bevel-pinion G, which pinion will revolve shaft F and pinion H, and pinion H will actuate pinion I' on the shaft I of the weeding-hoe J, and cause this hoe to revolve in direction of arrow 2 in Fig. 2, which will be in opposition to the direction of revolution of the drive-wheels B. In the revolutions of the weeding-hoe J the edges of the blades $a$ $a$ will be made to cut under and forwardly in the soil and below the roots of the weeds, and by reason of the incline of the shaft I the weeds will be thrown inwardly toward the furrow between the rows of plants and off from the plants. By making this revolving weeding-hoe adjustable on the length of the shaft I, and securing the same by the set-screw, the hoe can be set nigher to the frame or farther from the same, so as to adapt the machine to clear the soil between rows of plants which are close together or at greater distance apart, and also allow the operator to so adjust the hoe as to cause it to work close up to the plants or to a greater or less distance from the same, as desired. By the slant or incline of shaft I the outer edges of the cutters can be made to work close up to the plants without any liability of the said shaft striking the same and bending them down.

As the machine is drawn forward, the driver will, by the handle O' of lever O, guide the guide-wheel K toward the right or left or in a straight line accordingly as will be required to carry the blades of the weeding-hoe as near the plants as is desired by the operator, and by the near arrangement of the revolving hoe to this guide-wheel the former will be readily and quickly brought near the plants or away from them, as is desired, and at the same time the operator is guiding the machine to weed nearer to or farther from the plants, and will regulate the depth of the cut of the hoe, and at will will raise the same out from the soil by simply pressing down on the handle O' of lever O, when through rod Q and the arm N the forward end of the frame will be lifted and consequently raise the blades of the hoe correspondingly.

When it is desired not to operate the hoe while the machine is being drawn forward, the operator will, by the shifting lever T, throw the gear D out of engagement with pinion G, when he will turn the shaft F with its pinions G and H, and the shaft I and the revolving hoe J, together with their respective brackets and bearings from their operating or normal position upwardly in direction of the arrow in Fig. 4, which can be readily done by the brackets $e$ $e'$ of the bearings E E' turning on their pivots $e^2$ $e^2$ when the stop $d$ will have bearing against the sides of the frame and hold the said parts raised.

What I claim, and desire to secure by Letters Patent, is—

1. The combination, with the longitudinal shaft F, inclined forwardly and downwardly and actuated by gears, pinion H, secured to said shaft, shaft I, provided with gear I', set at an angle with shaft F and inclining outwardly and upwardly, of the adjustably-secured hub $b$ on shaft I, and the series of blades or cutters $a$ $a$, arranged relatively oblique to the direction of the axis of hub $b$, with their cutting-edges inclined relatively inwardly and toward shaft I, substantially as and for the purposes set forth.

2. The combination, with the gear D, revolved by the drive-wheel, shaft F, provided with pinions G and H, of the shaft I, provided with pinion I', and set at an angle to the inclined shaft F and inclined upwardly and outwardly from the axis of pinion I', and the series of cutters or blades connected with the central hub, $b$, adjustably secured to shaft I and having their cutting-edges made from one side edge to the other inclined in relation to the axis of said shaft, substantially as and for the purposes set forth.

3. The combination, with the frame A, mounted on drive-wheels, and the gear mechanism described, of the hinged brackets having within them the bearings E E', the supplemental bearings $e$, and the shaft of the revolving hoe, substantially as and for the purposes set forth.

AMBROSE L. SADDLEMYRE.

Witnesses:
ALEX. SELKIRK,
CHARLES SELKIRK.